United States Patent [19]

Kroner et al.

[11] Patent Number: 5,207,941
[45] Date of Patent: May 4, 1993

[54] USE OF WATER-SOLUBLE OR WATER-DISPERSIBLE GRAFTED PROTEINS AS DETERGENT ADDITIVES

[75] Inventors: Matthias Kroner, Bad Durkheim; Heinrich Hartmann, Limburgerhof; Richard Baur, Mutterstadt; Wolfgang Trieselt, Ludwigshafen, all of Fed. Rep. of Germany

[73] Assignee: BASF Aktiengesellschaft, Ludwigshafen, Fed. Rep. of Germany

[21] Appl. No.: 697,961

[22] Filed: May 10, 1991

[30] Foreign Application Priority Data

May 18, 1990 [DE] Fed. Rep. of Germany ....... 4016002

[51] Int. Cl.$^5$ ...................... C11D 3/37; C11D 3/384
[52] U.S. Cl. .......................... 252/174.23; 252/174.24; 252/DIG. 2; 252/DIG. 15; 106/124
[58] Field of Search .................. 252/174.23, 174.24, 252/DIG. 2, DIG. 15; 106/124

[56] References Cited

U.S. PATENT DOCUMENTS

| | | |
|---|---|---|
| 3,558,499 | 1/1971 | Galvin et al. |
| 3,594,324 | 7/1971 | Sayers et al. .................. 252/174.23 |
| 3,651,210 | 3/1972 | Shepler ........................ 252/174.23 |
| 4,474,694 | 10/1984 | Coco et al. ..................... 260/123.5 |
| 4,607,089 | 8/1986 | Riley et al. |
| 4,689,381 | 8/1987 | Krinski et al. ..................... 527/201 |
| 4,746,456 | 5/1988 | Kud et al. |
| 4,812,550 | 3/1989 | Erickson et al. |
| 4,846,994 | 7/1989 | Kud et al. ................... 252/DIG. 15 |
| 4,846,995 | 7/1989 | Kud et al. ................... 252/DIG. 15 |
| 4,897,215 | 1/1990 | Trieselt ........................ 252/DIG. 2 |
| 5,009,805 | 2/1991 | Permer et al. ................... 252/174.23 |
| 5,112,520 | 5/1992 | Krinski et al. ................ 252/174.23 |

FOREIGN PATENT DOCUMENTS

| | | |
|---|---|---|
| 0021379 | 6/1980 | European Pat. Off. ........ 252/174.23 |
| 0219048 | 4/1987 | European Pat. Off. |
| 55-155097 | 12/1980 | Japan .............................. 252/174.23 |
| 61-031498 | 2/1986 | Japan . |

OTHER PUBLICATIONS

World Patents Index, week 7924, 79-45046B, & JP-A-54-056612, May 7, 1979.
World Patents Index, week 7808, 78-14873A, & JP-A-53-002506, Jan. 11, 1978.
Journal of Polymer Science: Part A: Polymer Chemistry, vol. 27, 2123-2133 (1989).
D. Mohan, et al. "Graft Copolymerization of Acrylamide onto Casein: A Kinetic Study".
Journal of Applied Polymer Science, vol. 37, 2203-2212 (1989) Prabha R. Chatterji, "Gelatin with Hydrophilic/Hydrophobic Grafts and Glutaraldehyde Crosslinks".
Journal of Applied Polymer Science, vol. 36, 215-227 (1988) Jaroslav Stejskal, et al.
"Grafting of Gelatin during Polymerization of Methyl Methacrylate in Aqueous Medium".

Primary Examiner—Paul Lieberman
Assistant Examiner—Kery A. Fries
Attorney, Agent, or Firm—Oblon, Spivak, McClelland, Maier & Neustadt

[57] ABSTRACT

Phosphate-free and low-phosphate detergents which contain surfactants as essential constituents also contain from 0.1 to 20% by weight, based on the particular formulation, of water-soluble or water-dispersible grafted proteins obtainable by free radical copolymerization of (A) monoethylenically unsaturated monomers in the presence of
(B) proteins in a weight ratio of (A):(B) of (0.5-90):(99.5-10).

3 Claims, No Drawings

USE OF WATER-SOLUBLE OR WATER-DISPERSIBLE GRAFTED PROTEINS AS DETERGENT ADDITIVES

Ecological concerns have in recent years led to an intensified search for substances to take the place of phosphates in detergents. For instance, EP-B-0 025 551 discloses the use of copolymers of maleic acid and acrylic acid as incrustation inhibitors in detergents. The copolymer is used in the detergent formulation in amounts of up to 10%. By means of these copolymers it is possible to replace the hitherto customary phosphates in detergents in whole or in part. After the washing process, these copolymers pass into the wastewater and are almost completely absorbed therefrom in water treatment plants by the sewage sludge. However, liquid detergents containing copolymers of acrylic acid and maleic acid as phosphate substitutes frequently tend to separate on storage.

U.S. Application No. 4 746 456 discloses using graft copolymers of vinyl acetate on polyethylene glycols as grayness inhibitors in detergent formulations.

U.S. Application No. 3 558 499 discloses detergents which contain as essential constituents from about 10 to about 25% of an anionic or nonionic surfactant, from about 60 to about 89.9% of an inorganic builder, such as sodium tripolyphosphate, sodium carbonate or sodium silicate, and from about 0.1 to about 10% by weight of a grayness inhibitor. The grayness inhibitor is a graft copolymer of starch with acrylic acid or methacrylic acid. The level, of polymerized acrylic acid or methacrylic acid in the graft copolymer is about 1–50%.

JP-A-55/155 097 discloses detergent formulations which, to suppress soil redeposition during the wash, contain from 0.05 to 5% by weight of a grafted starch prepared by polymerizing from 0.5 to 100 parts by weight of a water-soluble monomer or by hydrolysis of progressively water-solubilized monomers in the presence of 100 parts by weight of starch. According to the examples, the soil antiredeposition agents used were a sodium acrylate-grafted oxidized starch (8 parts by weight of sodium acrylate per 100 parts by weight of oxidized starch), a hydroxypropyl methacrylate-grafted oxidized starch (2.5 parts by weight of hydroxypropyl acrylate per 100 parts by weight of starch), and a corn starch-poly-vinyl alcohol graft copolymer (100 parts by weight of corn starch per 5 parts by weight of 63% hydrolyzed vinyl acetate).

JP-A-61/031 498 discloses detergents which contain as builders from 0.5 to 50% by weight of graft polymers of a monosaccharide and/or an oligosaccharide and a water-soluble ethylenically unsaturated monomer. According to the examples, acrylic acid was grafted onto sucrose or glucose. As the operative and comparative examples of this publication show, the addition of polyacrylic acid to a detergent formulation boosts the detergency more than the addition of the same amount of acrylic or methacrylic acid-grafted starch. In contradistinction to virtually nonbiodegradable polyacrylic acid, the grafted starches are said to be highly biodegradable.

U.S. Application No. 4 812 550 discloses a process for preparing grafted proteins wherein ethylenically unsaturated monomers having not more than 14 carbon atoms in the molecule, for example conjugated dienes, nitriles, amides, acrylates, alkyl acrylates or vinylaryl monomers, are subjected to a free radical polymerization in an aqueous medium in the presence of solubilized proteins. The latices thus obtainable are used as binders for pigmented paper-coating compositions. U.S. Application No. 3 651 210 discloses that specific emulsion copolymers can be reacted with solubilized proteins. The so polymer-modified proteins are used as coating agents for producing leather-like coatings or films. The films thus obtainable are biodegradable. Information about reaction mechanisms involved in the preparation of polymers in the presence of proteins may be found for example in J. Polym. Sci. 27 (1989), 2123–2133, J. Appl. Polym. Sci. 37 (1989), 2203–2212, and J. Appl. Polym. Sci. 36 (1988), 215–227.

It is an object of the present invention to provide detergent additives which can take the place of phosphates in detergents and which are in particular compatible with liquid detergents and substantially biodegradable.

We have found that this object is achieved according to the present invention by using water-soluble or water-dispersible grafted proteins obtainable by free radical copolymerization of (A) monoethylenically unsaturated monomers in the presence of (B) proteins a weight ratio of (A):(B) of (0.5–90):(99.5–10) as additives in detergents in amounts of from 0.1 to 20% by weight, based on the particular formulation.

Monoethylenically unsaturated monomers of group (A) for preparing the grafted proteins are for example monoethylenically unsaturated $C_3$–$C_8$-carboxylic acids, eg. acrylic acid, methacrylic acid, ethacrylic acid, crotonic acid, maleic acid, fumaric acid, itaconic acid, aconitic acid and vinylacetic acid. It is also possible to use, if industrially available, the corresponding anhydrides, eg. maleic anhydride or itaconic anhydride. Of the aforementioned compounds, preference is given to acrylic acid, methacrylic acid, maleic acid, maleic anhydride and mixtures thereof. The carboxylic acids can be used in the graft copolymerization as free carboxylic acids or in the form of salts with inorganic or organic bases. To neutralize the monoethylenically unsaturated carboxylic acids it is possible to use for example sodium hydroxide, potassium hydroxide, ammonia, trimethylamine, triethylamine, tributylamine, triethanolamine, diethanolamine, morpholine, methylamine or dimethylamine. For neutralization purposes it is also possible to use mixtures of various bases, for example sodium hydroxide and ethanolamine.

Suitable compounds of group (A) also include the esters of the abovementioned carboxylic acids with monohydric or polyhydric $C_1$–$C_{22}$-alcohols or the addition products of 1 to 50 mol of an alkylene oxide, such as ethylene oxide, propylene oxide or butylene oxide, with 1 mol of a $C_1$–$C_{22}$ alcohol. Suitable alcohols for esterifying the above-described monoethylenically unsaturated carboxylic acids are for example methanol, ethanol, n-propanol, isopropanol, n-butanol, isobutanol, tert-butanol, 2-ethylhexyl alcohol, stearyl alcohol, palmityl alcohol, decyl alcohol, dodecyl alcohol, tallow fat alcohol, sorbitol, mannitol, glycerol, ethylene glycol, propylene glycol, ethylene glycol butyl ether and diethylene glycol methyl ether. Preference is given to using the esters of acrylic acid and methacrylic acid with methanol, ethanol, n-propanol, n-butanol, tert-butanol, 2-ethylhexyl alcohol, stearyl alcohol, ethylene glycol and propylene glycol. The aforementioned alcohols can, however, first be alkoxylated, for example by reaction with ethylene oxide and/or propylene oxide, and then esterified with acrylic acid or other abovementioned monoethylenically unsaturated carboxylic acids. Of the esters mentioned, particular preference is given to n-butyl acrylate, methyl methacrylate and ethyl acrylate mixed with acrylic acid and methacrylic acid for the graft copolymerization in the presence of proteins.

Other suitable monomers of group (A) are the amides of $C_3$–$C_8$-carboxylic acids which are derived from ammonia, $C_1$–$C_{22}$-alkylamines or dialkylamines. Suitable amines for preparing the amides are for example methylamine, dimethylamine, stearylamine, tallow fat amine and palmitylamine. It is also possible to use the N-methylol derivatives of amides, for example N-methylolacrylamide or N-methylolmethacrylamide. The aforementioned N-methylol derivatives of the amides may also be etherified, for example with $C_1$–$C_{22}$-alcohols, eg. N-(butoxymethyl)acrylamide and N-(isobutoxymethyl)acrylamide. A further modification results from the fact that the N-methylolated amides may be etherified with alkoxylated alcohols, for example N-alkyloxypolypropoxyacrylamide or N-alkyloxypolysthoxyacrylamide, in which case the alkyl moiety may have from 1 to 22 carbon atoms and the degree of alkoxylation may range from 1 to 100.

Other suitable monomers (A) are the nitriles of carboxylic acids, such as acrylonitrile or methacrylonitrile, vinyl ethers of alcohols containing from 1 to 8 carbon atoms, eg. vinyl methyl ether, vinyl isobutyl ether, vinyl n-butyl ether, vinyl ethyl ether and vinyl isopropyl ether, and also vinyl esters of saturated $C_1C_{22}$-carboxylic acids, in particular vinyl acetate, vinyl propionate and vinyl butyrate. Other possible monomers are N-vinylamides, such as N-vinylformamide, N-vinyl-N-methylformamide, N-vinylacetamide, N-vinylcaprolactam or N-vinylpyrrolidone. It is also possible to use vinylpyridines, such as N-vinylpyridine, 2-vinylpyridine and 4-vinylpyridine, acrylamidopropanesulfonic acid, acrylamidoethanesulfonic acid, N,N-dialkylamino-$C_2$-$C_4$-alkyl(meth)acrylamides, eg. dimethylaminoethylacrylamide, dimethylaminoethylmethacrylamide, diethylamino-ethylacrylamide and diethylaminoethylmethacrylamide. These compounds are preferably used as salts or in the form of quaternized compounds. However, they can also be subjected to the copolymerization in the form of the free base. Preferably, these compounds are used in the form of the hydrochlorides, methochlorides and methosulfates. Other suitable monomers are styrene and alkylstyrenes. The graft copolymers contain the monomers (A) in copolymerized form in amounts of from 0.5 to 90, preferably from 10 to 85, % by weight.

The other essential component of the graft copolymerization is a protein (B). For this purpose it is possible to use any protein which, under the conditions of the polymerization, is soluble in the polymerization medium in a proportion of at least 20% by weight. Suitable proteins are described for example in above cited U.S. Pat. No. 4,812,550. A further survey of suitable proteins may be found in Ullmanns Enzyklopädie der technischen Chemie, 4th Edition, Weinheim 1980, Volume 19, 491–557. The proteins in question are sustainable raw materials. They are derived for example from skin, hides, supportive and connective tissue, bones and cartilage: collagen, elastin, gelatin, ossein and glue. Proteins from milk are whey proteins, casein and lactalbumin. Wool, bristles, feathers and hairs are the source of keratin. It is also possible to use proteins from fish and eggs and from blood as slaughterhouse waste, for example blood proteins, albumin, globulin, globin, fibrinogen and hemoglobin. Other suitable proteins come from plants, such as corn, wheat, barley and oats: glutelin, prolamin, zein and gluten. It is also possible to obtain proteins from seeds, for example from soybeans, cotton seeds, peanuts, sunflower seeds, rapeseed, coconut, linseed, sesame, safflower, peas, beans and lentils. It is also possible to use the protein constituents of clover, lucerne, grass, potatoes, manioc and yam. Further protein sources are bacteria, fungi, algae and yeasts, eg. Pseudomonas, Lactobacillus, Penicillium, blue algae, green algae, Chlorella, Spirulina and exhausted yeast. The proteins which are preferred for use as component (B) for preparing the graft copolymers are casein, gelatin, bone glue and proteins from soybeans, cereals, corn and peas. The proteins are for example isolated from the natural raw materials by dissolving, grinding, sifting and classifying. To convert them into a soluble form, they need in many cases to be subjected to a digestive process in the form of a physical, chemical or enzymatic treatment, for example hydrolysis with acid or alkalis, fermentation with yeasts, bacteria or enzymes, extraction methods for removing concomitants, coagulation from extracts by heat, addition of electrolyte, pH change or addition of coagulating agents. To obtain pure products, a possible option is for example fractional dissolving and precipitating and a dialysis process.

In the copolymerization, the monoethylenically unsaturated monomers (A) are used with the proteins (B) in a weight ratio of (A):(B) of (0.5–90):(99.5–10), preferably (10–85):(90–15).

The monomers (A) are polymerized in the presence of proteins by a free radical mechanism. The free radical donor can be any compound known for this purpose. This initiator may be soluble or else insoluble in water. Water-soluble initiators are for example inorganic peroxides, such as potassium peroxodisulfate, sodium peroxodisulfate, ammonium peroxodisulfate and hydrogen peroxide. It is also possible to use organic peroxides, hydroperoxides, peracids, ketone peroxides, perketals and peresters, eg. methyl ethyl ketone hydroperoxide, cumene hydroperoxide, tert-butyl hydroperoxide, 1,1-di(tert-butylperoxy)cyclohexane, di(tert-butyl) peroxide, tert-butyl peroxypivalate, tert-butyl monoperoxymaleate, dicyclohexyl peroxydicarbonate, dibenzoyl peroxide, diacetyl peroxide, didecanoyl peroxide and mixtures thereof. It is also possible to use redox systems which combine a peroxy compound with a reducing component. Suitable reducing components are for example cerium(III) and iron(II) salts, sodium sulfite, sodium hydrogen sulfite, sodium dithionite, ascorbic acid and sodium formaldehydesulfoxylate. The initiator chosen is preferably a compound which forms free radicals and has a halflife of less than 3 hours at the particular chosen polymerization temperature. If the polymerization is started at a low temperature and completed at a higher temperature, it is advantageous to use at least two initiators which decompose at different temperatures, namely an initiator which decomposes at a low temperature for the start of the polymerization and an initiator which decomposes at the high temperature for the completion of the main part of the polymerization. By adding heavy metal salts, for example copper, cobalt, manganese, iron, nickel and chromium salts, to peroxidic catalysts it is possible to reduce the decomposition temperature of the latter. Suitable initiators also include azo compounds, such as 2,2'- azobisisobutyronitrile, 2,2'-azobis(2-amidinopropane) dihydrochloride, 2,2'-azobis(2-methylpropionamidine) dihydrochloride, 2,2'-azobis(2,4-dimethylvaleronitrile) and dimethyl 2,2'-azobisisobutyrate. Particular preference is given to using hydrogen peroxide, potassium peroxodisulfate, ammonium peroxodisulfate and sodium peroxodisulfate and tert-butyl perpivalate as initiator in the graft copolymerization. Based on the monomers to be polymerized, the amount of initiator or initiator mixture used is from 0.5 to 10, preferably from 1 to 6, % by weight. The amount of initiator used can have an appreciable influence on the graft copolymer which is formed.

The graft copolymerization may, if desired, be carried out in the presence of regulators. Suitable regulators are for example mercapto compounds, such as mercaptoethanol, mercaptopropanol, mercaptobutanol, mercaptoacetic acid, mercaptopropionic acid, butylmercaptan and dodecylmercaptan. Suitable regulators also include allyl compounds, such as allyl alcohol, aldehydes such as formaldehyde, acetaldehyde, propionaldehyde, n-butyraldehyde and isobutyraldehyde, formic acid, ammonium formate, propionic acid, hydroxylamine sulfate and butenols. If the graft copolymerization is carried out in the presence of regulators, they may be used in amounts of from 0.05 to 20% by weight, based on the monomers used in the polymerization.

The polymerization can be carried out in an aqueous medium or in an organic solvent in which the proteins are soluble to at least 20% by weight. Suitable organic solvents are for example dimethylformamide, acetic acid, formic acid, alcohols, such as methanol, n-propanol, isopropanol, n-butanol, tert-butanol and isobutanol, and ethers, such as tetrahydrofuran, dioxane, diethylene glycol, ethylene glycol dimethyl ether, diethylene glycol dimethyl ether, ethylene glycol monomethyl ether, diethylene glycol monomethyl ether, ethoxylated fatty alcohols and oxo process alcohols (from 2 to 100 mol of ethylene oxide added to 1 mol of alcohol), for example the adducts of 7 mol of ethylene oxide with 1 mol of dodecanol or with 1 mol of a $C_{13}/C_{15}$ oxo process alcohol. It is also possible to use ketones, such as acetone and methyl ethyl ketone, as inert diluents in the graft polymerization. Particular preference is given to the use of methanol, isopropanol, tetrahydrofuran, dioxane and ethoxylated fatty and oxo process alcohols. If anhydride group-containing graft copolymers are to be prepared, for example by polymerizing maleic anhydride in the presence of a protein, the polymerization is carried out in an anhydrous organic solvent which is inert towards the anhydride, eg. in acetic acid, dioxane or tetrahydrofuran. The graft polymerization can be carried out in mixtures of organic solvents and also in mixtures of water and organic solvents which are soluble in water. The concentration of monomer and protein in the particular solvent used is from 10 to 60, preferably from 15 to 50, % by weight.

It is also possible for additional additives comprising anionic, nonionic, amphoteric or cationic surfactants and also all the constituents of the detergents described hereinafter to be present in amounts of from 0 to 30% based on the monomers. By adding these constituents it is possible to influence the properties of the graft copolymers.

The graft copolymerization is carried out in customary apparatus equipped with mixing elements, for example in stirred flasks, kettles, autoclaves and cylindrical reactors. The graft copolymerization may also be carried out in kettle cascades or in other interconnected polymerization apparatus. The copolymerization may be carried out batchwise or continuously. Suitable polymerization apparatus also includes kneaders. If water-soluble monomers (A) are used in the graft polymerization, the polymerization may also be carried out as a reverse suspension polymerization or as a water-in-oil emulsion polymerization. Preferably, the graft polymerization takes the form of a solution polymerization. For specific applications it may be useful to employ a precipitation polymerization. The polymerization need not be initiated solely with free radical initiators, but may also be initiated by the action of UV radiation or by the action of high-energy rays, for example $\alpha$- or $\beta$- or $\gamma$-rays. The graft copolymerization is carried out within the temperature range from 20° to 160° C., preferably from 30° to 100° C. In the case of temperatures which are above the boiling point of the particular solvent used, the graft copolymerization is customarily carried out in pressure-tight apparatus. The polymerization is preferably carried out in an inert gas atmosphere in the absence of atmospheric oxygen, for example by using nitrogen, argon, helium or carbon dioxide as inert gas.

The reaction temperature and the amount of initiator can have a significant effect on the properties of the graft copolymers formed.

In the case of relatively small polymerization batches, where the heat of polymerization can be removed sufficiently rapidly, the monomers to be polymerized and the protein can be introduced into the reaction vessel at the start together with at least one polymerization initiator and polymerized by heating to the particular polymerization temperature required. It is more advantageous, however, to charge the polymerization apparatus with only a portion of the monomers and a portion of the initiator and to add the remaining monomers and initiator continuously or batchwise at a rate commensurate with the rate of polymerization. The order in which the reactants are metered into the polymerization reactor can be freely varied. For instance, it is possible to heat a solution or dispersion of the protein in the reactor to the required polymerization temperature and to add the monomers and initiators continuously or batchwise. If a plurality of monomers are used in the graft copolymerization, the individual monomers can be metered into the polymerization zone in succession, or as a mixture or else simultaneously from separate metering means. However, this variation can have considerable effects on the effectiveness of the graft polymers when used as detergent additives.

Similarly, the pH of the reaction medium can have an influence on the properties of the graft copolymer. The solubility of the proteins below and above the iso-electric point can be utilized in the graft copolymerization. Acidic or basic monomers can be used in the form of the corresponding salts. For instance, acrylic acid is employed in the form of a free acid or in the form of an alkali salt. The graft copolymerization can be carried out within the pH range from 1 to 14, preferably from 6 to 12. By changing the pH it is possible for example to precipitate the graft copolymers from solutions. This possibility may be employed when working up, purifying and isolating the graft copolymers. It can be of advantage to use 2 or more proteins in the graft copolymerization. The order in which these proteins are used can have favorable effects on the properties of the graft copolymers formed. In some cases it is of advantage to utilize the emulsifying power of a protein by first emulsifying a water-insoluble monomer with a protein and then adding a further protein and subjecting the reaction mixture to the graft copolymerization. The proteins used in the graft copolymerization may be chemically modified in various ways before or after the graft polymerization. For example, it can be of advantage to partially degrade the protein before the polymerization by hydrolytic or enzymatic means. Depending on the reaction conditions, a partial hydrolytic degradation of the proteins may take place during the graft copolymerization. After the graft copolymerization the graft copolymers may be modified in various ways, for example graft copolymers of maleic anhydride or itaconic anhydride on proteins prepared in the absence of water may be esterified by reaction with alcohols or converted into the acid form by the addition of water. Graft copolymers of alkyl acrylates on proteins may be hydrolyzed with elimination of an alcohol.

Similarly, before or after the free radical grafting, functional groups of the proteins can be reacted with reactive carboxylic acid derivatives, for example carboxylic anhydrides. Examples of carboxylic anhydrides are acetic anhydride, succinic anhydride and maleic anhydride.

The grafted proteins thus obtainable with monoethylenically unsaturated monomers either in dissolved or dispersed form have K values of from 10 to 200, preferably from 15 to 180 (determined by the method of H. Fikentscher in 1% strength aqueous solution at 25° C. and pH 7). They are added to detergent formulations in amounts of from 0.1 to 20% by weight, based on the particular formulations. In detergent formulations they bring about an improvement in the primary and secondary detergency and they also have soil release properties. According to the present invention, they are used in detergents which are either phosphate-free or have a phosphate content of not more than 25% by weight of sodium triphosphate. The graft copolymers can be added to the detergent formulations in the form of granules, in the form of a paste, as a highly viscous mass, as a dispersion or as a solution in a solvent. The graft copolymers can also be adsorbed on the surface of inert diluents, for example sodium sulfate, or builders (zeolites or bentonites) or on other solid constituents of detergent formulations.

In the closed bottle test the graft copolymers show a degree of biodegradability which corresponds to the protein content, and in the Zahn-Wellens elimination test they are very readily eliminable. If they are to be stored in the presence of water, a commercial preservative is added. In the air-dried state, the graft copolymers have long storage lives even without preservatives.

The detergent formulations in question are pulverulent or liquid. The composition of those principally used for washing can differ greatly. The same is true of those used as cleaners. Both washing and cleaning detergent formulations customarily contain surfactants with or without builders. This is true not only of liquid but also of pulverulent washing and cleaning detergent formulations. Examples of the compositions of washing detergent formulations customary in Europe, the USA and Japan may be found for example in Chemical and Engineering News 67 (1989), 35, in table form and Ullmanns Encyklopädie der technischen Chemie, Verlag Chemie, Weinheim 1983, th edition, pages 63–160.

Universal household detergents for drum type washing machines of the type widely used in Europe usually contain from 5 to 10% by weight of anionic surfactants, from 1 to 5% by weight of nonionic surfactants, from 1 to 5% by weight of foam regulators, such as silicone oils or soaps, from 0 to 40% by weight of a water softener, such as sodium carbonate or pentasodium triphosphate, which may be replaced in whole or in part by the compounds of the present invention, from 0 to 30% by weight of an ion exchanger such as zeolite A, from 2 to 7% by weight of sodium silicates as corrosion inhibitors, from 10 to 30% by weight of bleaching agents, such as sodium perborate or sodium percarbonate, from 0 to 5% by weight of bleach activators, such as tetraacetylethylenediamine, pentaacetylglucose, hexaacetylsorbitol or acyloxybenzenesulfonate, stabilizers, such as magnesium silicate or ethylenediaminetetraacetate, grayness inhibitors, such as carboxymethylcellulose, methylalkylcelluloses and hydroxyalkylcelluloses, vinyl acetate-grafted polyglycols, oligomeric and polymeric terephthalic acid/ethylene glycol/polyethylene glycol esters, enzymes, fluorescent whitening agents, scents, fabric softeners, dyes, and diluents.

By contrast, the heavy duty detergents which are widely used in the USA, Japan and neighboring countries in tub type washing machines are usually free of bleaching agents, but on the other hand their anionics content is two to three times higher and they contain more wash alkalis, such as sodium carbonate and sodium silicates (in general up to 25% by weight) and naturally they also lack the bleach activators and bleach stabilizers. The levels of surfactants and other ingredients can be appreciably higher in the case of detergent concentrates, which are available with little or no diluent.

Detergents for easy-care and colored fabrics, wool detergents and hand washing detergents likewise usually contain no bleaching agents and only low levels of alkaline ingredients together with a correspondingly higher surfactant content.

Detergents for the commercial laundry sector are designed for the special conditions of industrial washing (soft water, continuous washing) which make it possible to customize the detergent to the type of article being washed and to the nature of the soil. Combinations are therefore used in which one ingredient predominates or others are completely absent only to be added separately when required. For this reason the surfactants, builders, alkalis and bleaching agents of these detergents vary within wide limits.

Suitable anionic surfactants for the aforementioned pulverulent washing detergents, or washing powders, are for example sodium alkylbenzenesulfonates, fatty alcohol sulfates and fatty alcohol polyglycol ether sulfates. Individual compounds of this type are for example $C_8$–$C_{12}$-alkylbenzenesulfonates, $C_{12}$–$C_{16}$-alkanesulfonates, $C_{12}$–$C_{16}$-alkyl sulfates, $C_{12}$–$C_{16}$-alkyl sulfosuccinates and sulfated ethoxylated $C_{12}$–$C_{16}$-alkanols. Other suitable anionic surfactants are sulfated fatty acid alkanolamines, fatty acid monoglycerides or reaction products of from 1 to 4 mol of ethylene oxide with primary or secondary fatty alcohols or alkylphenols. Further suitable anionic surfactants are fatty acid esters and fatty acid amides of hydroxy- or aminocarboxylic or -sulfonic acids, for example the fatty acid sarcosides, glycolates, lactates, taurides or isethionates. The anionic surfactants can be present in the form of the sodium, potassium and ammonium salts and also as soluble salts of orqanic bases, such as mono-, di- or triethanolamine or other substituted amines. The group of anionic surfactants also includes the ordinary soaps, ie. the alkali metal salts of natural fatty acids.

Suitable nonionic surfactants (nonionics) are for example addition products of from 3 to 40, preferably from 4 to 20, mol of ethylene oxide with 1 mol of fatty alcohol, alkylphenol, fatty acid, fatty amine, fatty acid amide or alkanesulfonamide. Of particular importance are the addition products of from 5 to 16 mol of ethylene oxide with coconut or tallow fatty alcohols, with oleyl alcohol or with synthetic alcohols of from 8 to 18, preferably from 12 to 18, carbon atoms, and also with mono- or dialkylphenols having from 6 to 14 carbon atoms in the alkyl moieties. Besides these water-soluble nonionics, however, it is also possible to use water-insoluble or incompletely water-soluble polyglycol ethers having from 1 to 4 ethylene glycol ether moieties in the molecule, in particular if they are used together with water-soluble nonionic or anionic surfactants.

Further usable nonionic surfactants are the water-soluble addition products of ethylene oxide with propylene glycol ethers, alkylenediaminopolypropylene glycol and alkylpolypropylene glycols having 1 to 10 carbon atoms in the alkyl chain that contain from 20 to 250 ethylene glycol ether groups and from 10 to 100 propylene glycol ether groups, the polypropylene glycol ether chain acting as hydrophobe.

It is also possible to use nonionic surfactants of the type of the amine oxides or sulfoxides.

The foaming power of the surfactants can be increased or reduced by combining suitable surfactant types. A reduction can also be achieved by adding non-surfactant-like organic substances.

Further possible formulation ingredients of detergents include monomeric, oligomeric and polymeric phosphonates, ether sulfonates based on unsaturated fatty alcohols, eg. sulphonated oleyl alcohol ethoxylate butyl ether and alkali metal salts thereof. These substances can be characterized for example with the aid of the formula $RO(CH_2CH_2O)_n$—$C_4H_8$—$SO_3Na$, where n is from 5 to 40 and R is oleyl.

The above-described graft copolymers can also be used as additives in liquid washing detergents. Liquid detergents contain liquid surfactants or else solid surfactants which are soluble or at least dispersible in the detergent formulation. Suitable surfactants for this purpose are those products which are also used in pulverulent detergents but also liquid polyalkylene oxides or polyalkoxylated compounds. If the graft copolymers are not directly miscible with the other constituents of the liquid detergent, it is possible to prepare homogeneous mixtures with the aid of a small amount of a solubilizer, for example water or a water-miscible organic solvent, eg. isopropanol, methanol, ethanol, glycol, diethylene glycol or triethylene glycol or corresponding propylene glycols. The amount of surfactant in liquid detergents is within the range from 4 to 50% by weight, based on the formulation as a whole, since in liquid detergents, too, the proportions of the ingredients vary within wide limits according to regional market conditions or the intended application.

Liquid detergents may contain water in amounts of from 10 to 60, preferably from 20 to 50, % by weight. However, they can also be free of water.

Water-free liquid detergents may also contain suspended or dispersed peroxo compounds for bleaching. Examples of suitable peroxo compounds are sodium perborate, peroxocarboxylic acids and polymers having some peroxo-containing groups. Liquid detergents may also contain hydrotropes. These are compounds such as 1,2-propanediol, cumenesulfonate and toluenesulfonate. If such compounds are used for modifying a liquid detergent, their amount is from 2 to 5% by weight, based on the total weight of the liquid detergent. In many cases an addition of complexing agents has also proved advantageous for modifying pulverulent and liquid detergents. Complexing agents are for example ethylenediaminetetraacetic acid, nitrilotriacetate and isoserinediacetic acid and also phosphonates, such as aminotrismethylenephosphonic acid, hydroxyethanediphosphonic acid, ethylenediaminetetraethylenephosphonic acid and salts thereof. Complexing agents are used in amounts of 0 to 10% by weight, based on the detergent. The detergents may also contain citrates, di- or triethanolamine, or opacifiers, fluorescent whitening agents, enzymes, perfume oils and dyes. These substances, if they are used for modifying a liquid detergent, together account for up to 5% by weight. The detergents are preferably phosphate-free. However, they may also contain phosphates, for example pentasodium triphosphate and/or tetrapotassium pyrophosphate. If phosphates are used, they account for up to 25% by weight of the total formulation of the detergent.

The K values of the polymers were determined by the method of H. Fikentscher, Cellulosechemie 13 (1932), 58–64, 71–74; $K = k \times 10^3$. The measurements were carried out on 1% strength aqueous solutions of the graft copolymers at 25° C. and pH 7. The percentages are by weight, unless otherwise stated.

EXAMPLES

Preparation of graft copolymers

Graft copolymer 1

A 2 l capacity vessel equipped with a horseshoe stirrer, a reflux condenser and a device for working under nitrogen is charged with 400 g of water, followed by 120 g of casein, added with stirring. 6 g of 60% strength aqueous sodium hydroxide solution are added at 20° C. to obtain a clear, viscous solution, to which are added 130 g of 30% strength aqueous sodium acrylate solution and 100 g of 3% strength aqueous potassium peroxodisulfate solution. The reaction mixture is then heated with stirring to 70° C. and maintained at that temperature for 4 hours. A preservative is then added to obtain a solution of a graft copolymer of acrylic acid on casein having a solids content of 21%. The graft copolymer has a K value of 22.9.

Graft copolymers 2 to 4

These graft copolymers are prepared in the same way as graft copolymer 1 using the starting material quantities shown below. The desired solids content is obtained by adding water.

| Graft copoly-mer | Water g | Casein g | 50% strength sodium hydroxide solution g | 30% strength aqueous sodium acrylate solution g | 3% strength aqueous sodium peroxodisulfate solution g | Solids content % | K value |
|---|---|---|---|---|---|---|---|
| 2 | 400 | 120 | 6 | 66 | 100 | 19 | 24.9 |
| 3 | 400 | 120 | 6 | 600 | 150 | 23.8 | 118 |
| 4 | 180 | 60 | 3 | 800 | 150 | 19.3 | 161 |

In each case a homogeneous, viscous solution is obtained.

Graft copolymer 5

In the apparatus used for the preparation of graft copolymer 1, 120 g of casein are suspended in 380 g of water. 6 g of 50% strength aqueous sodium hydroxide solution are added to obtain a clear solution of casein in water, to which is then added at room temperature in one portion a solution of sodium maleate obtainable by dissolving 24.5 g of maleic anhydride in 100 g of water and adding 40 g of 50% strength aqueous sodium hydroxide solution, followed, again added all at once, by a 30% strength aqueous sodium acrylate solution prepared by neutralizing 115 g of acrylic acid in 260 g of water with 128 g of 50% strength aqueous sodium hydroxide solution. The reaction solution thus obtainable is admixed with 150 g of 3% strength aqueous potassium peroxodisulfate solution and then heated with stirring under nitrogen to 90° C. and polymerized at that temperature for 4 hours. A preservative is then added to obtain a viscous solution having a solids content of 22.6%. The graft copolymer has a K value of 52.5.

Graft copolymer 6

In a 2 l capacity stirred vessel equipped with a horseshoe stirrer, a reflux condenser, metering means and a pH glass electrode, 120 g of casein are suspended in 600 g of water at 20° C. Then 8 g of 50% strength sodium hydroxide solution are added, so that a clear solution forms. Then a solution of 24.5 g of maleic anhydride in 30 g of anhydrous acetone is added dropwise over half an hour with very vigorous stirring while the pH of the reaction mixture is maintained at from 7 to 8 by adding 90 g of 10% strength aqueous sodium hydroxide solution. The reaction mixture is subsequently stirred at 20° C. for a further 5 hours and then left to stand for 15 hours. A solution of 115 g of acrylic acid in 250 g of water which has been neutralized with 128 g of 50% strength aqueous sodium hydroxide solution is then added all at once, followed by a solution of 4.5 g of potassium peroxodisulfate in 150 g of water, and the reaction mixture is then heated to 90° C. under nitrogen and left to polymerize at that temperature for 7 hours. A preservative is then added to obtain a low-viscosity solution having a solids content of 18.9%. The graft copolymer has a K value of 50.1.

Graft copolymer 7

In the reactor used for preparing graft copolymer 6, 120 g of casein are suspended in 550 g of water. 180 g of vinyl acetate are then added and the mixture is stirred for 15 minutes. Then a solution of 8 g of 50% strength aqueous sodium hydroxide solution in 25 g of water is then metered in over 30 minutes and the mixture is stirred at 20° C. for 30 minutes. The mixture is then heated to 90° C. and a solution of 3 g of potassium peroxodisulfate in 100 g of water is added all at once. The pH of the reaction mixture is maintained within the range from 7 to 8 by adding 10% strength aqueous sodium hydroxide solution. The reaction mixture is stirred at 90° C. for 2 hours, admixed with a solution of 1 g of potassium peroxodisulfate in 50 g of water and then maintained at 90° C. for a further 5 hours. After 1 g of tert-butyl perpivalate has been added, the reaction mixture is heated at 90° C. for a further 3 hours. The unconverted vinyl acetate is then distilled off by passing in steam. The result obtained is an emulsion of a graft copolymer having a solids content of 13.7% and a viscosity of 73.6 mPas (measured at 20° C.), and a commercial preservative is added to stabilize the emulsion.

Graft copolymer 8

A 2 l reactor equipped with a mechanical stirrer and 2 feed vessels is charged under nitrogen with 600 g of water at 20° C., followed by 120 g of solid casein, added with stirring. 9.5 g of 50% strength sodium hydroxide solution are added, and the suspension turns into a viscous solution of pH 10. This solution is heated to 70° C., and 30 g of vinyl acetate and a solution of 3 g of potassium peroxodisulfate in 100 g of water are added dropwise over 45 minutes. The temperature is raised to 80° C. and the mixture is left to polymerize for a further 2 hours with stirring. A further 1.5 g of potassium peroxodisulfate in 50 g of water are added and stirring is continued at 80° C. for a further 4 hours. A commercial preservative is added to obtain a cloudy solution of the graft copolymer having a solids content of 17.6% by weight and a K value of 27.9. The level of monomeric vinyl acetate in the aqueous emulsion is less than 0.003% by weight.

Graft copolymer 9

A 2 l reactor equipped with an efficient mechanical stirrer and a reflux condenser is charged under nitrogen with 400 g of water, followed by 120 g of casein, added with stirring. 50% strength sodium hydroxide solution is then added, followed by 180 g of n-butyl acrylate, added over 10 minutes. 100 g of methanol are then added dropwise to the mixture over 5 minutes and the mixture is stirred at 20° C. for 30 minutes. After a solution of 3 g of potassium peroxodisulfate in 100 g of water has been added, the mixture is heated to the boil and stirred at that temperature for a further hour. A solution of 2 g of potassium peroxodisulfate in 100 g of water is then added dropwise over 2 hours while the mixture is maintained under reflux. The methanol is distilled off to obtain, after the pH has been adjusted to 8 by means of sodium hydroxide solution and water, a milky aqueous emulsion having a solids content of 28% and a K value of 24.5. The proportion of monomeric butyl acrylate is 0.07%. The emulsion is stabilized with a commercial preservative.

Graft copolymer 10

In a 2 l reactor, 450 g of water and 120 g of casein are intimately mixed at 20° C. and then admixed with 40 g of methyl methacrylate, followed by 40 g of 10% strength sodium hydroxide solution. Stirring is continued at 20° C. for 30 minutes, at which point a solution of 2 g of sodium peroxodisulfate in 100 g of water is added, and the mixture is heated to 80° C. It is stirred at that temperature for 1 hour and then has added to it, dropwise, over an hour a sodium acrylate solution prepared by neutralizing a solution of 26 g of acrylic acid in 50 g of water with 29 g of 50% strength sodium hydroxide solution and at the same time over 1.5 hours a solution of 2 g of sodium peroxodisulfate in 100 g of water, after which the polymerization is allowed to continue at that temperature for a further hour with stirring. The cloudy solution obtained has a solids content of 21% by weight, a K value of 26.4 and a residual monomer content of 0.002% of methyl methacrylate. A commercial preservative is added to stabilize the sample.

APPLICATION EXAMPLES

The effectiveness of the graft copolymers of the present invention in liquid detergents is demonstrated in the Examples by means of the primary and secondary detergency of these detergents.

Primary detergency is the actual process of soil removal from the textile material. The degree of soil removal is determined as the difference in the whiteness between the washed and the unwashed textile material. The textile test materials used are cotton, cotton/polyester and polyester fabrics with standard soiling. After every wash, the whiteness of the fabric is determined using an Elrepho photometer from Zeiss as % reflectance.

Secondary detergency is the detersive effect relating to the redeposition of detached soil on the fabric in the wash liquor. Secondary detergency can be demonstrated only after several washes, for example 3, 5, 10 or even 20 washes, which show an increase in the grayness of the fabric due to the redeposition of soil on the fabric from the wash liquor. To determine the graying, standard soil cloths are repeatedly washed together with white test fabric, the soil cloths being renewed after every wash. The soil which detaches from the soil cloth and deposits on the white test fabric during the wash causes a drop in whiteness, which is measured. The graft copolymers to be used according to the present invention in liquid detergents can also be used for formulating pulverulent detergents.

| Liquid detergents | |
|---|---|
| Formulation A | |
| 10% | of sodium dodecylbenzenesulfonate, 50% strength in water |
| 3% | of the reaction product of 1 mol of $C_{13/15}$ oxo process alcohol and 7 mol of ethylene oxide |
| 2% | of polypropylene glycol (molecular weight 600) |
| 77% | of water |
| 8% | of graft copolymer to be used according to the present invention |
| Formulation B | |
| 13.5% | of sodium dodecylbenzenesulfonate, 50% strength in water |
| 17% | of the reaction product of 1 mol of $C_{13/15}$ oxo process alcohol and 7 mol of ethylene oxide |
| 14% | of coconut fatty acid |
| 0.7% | of citric acid |
| 7% | of triethanolamine |
| 1% | of KOH |
| 7% | of isopropanol |
| 5% | of polypropylene glycol (molecular weight 600) |
| 8% | of graft copolymer to be used according to the |

| -continued | |
|---|---|
| Liquid detergents | |
| 26.8% | present invention of water |

A copolymer-free detergent formulation was tested for comparison.

| Washing conditions 1. Primary detergency | |
|---|---|
| Soil removal, whiteness - % reflectance | |
| Washing machine | Launder-O-meter |
| Washing temperature | 60° C. |
| Water hardness | 3 mmol of $Ca^{2+}/l$ = 16.8° German hardness |
| Ratio of Ca:Mg | 3:1 |
| Washing time | 30 minutes |
| Wash cycles | 1 |
| Detergent dose | 6 g of detergent per liter |
| Liquor ratio | 14.3:1 |
| Fabrics | WFK 20 D polyester/cotton (PES/Co) MG 111 (clay/PES/Co) WFK 10 D (Co) |
| Whiteness measurement in Elrepho in % reflectance | |
| Whiteness of unwashed fabrics: | |
| WFK 10 D | 43.0 |
| WFK 20 D | 40.6 |
| MG 111 | 24.5 |
| WFK = Wäschereiforschung Krefeld | |

The results obtained are shown in Table 1.

| 2. Secondary detergency | |
|---|---|
| Grayness | |
| Washing machine | Launder-O-meter |
| Washing temperature | 60° C. |
| Water hardness | 3 mmol of $Ca^{2+}/l$ = 16.8° German hardness |
| Ratio of Ca:Mg | 3:1 |
| Washing time | 30 minutes |
| Wash cycles | 4 |
| Detergent dose | 6 g of detergent per liter |
| Liquor ratio | 14.3:1 |
| Fabrics | |
| White fabrics: | Cotton/polyester weave Polyester weave |
| Soil cloth: | WFK 20 D/WFK 10 D MG 111 (replaced after every wash) |
| Whiteness measurement in Elrepho in % reflectance | |
| Whiteness of unwashed fabrics: | |
| Cotton/polyester | 82.7 |
| Polyester | 80.0 | the results are shown in Table 2.

TABLE 1

| | | Primary detergency | | | |
|---|---|---|---|---|---|
| | | Whiteness - % reflectance | | | |
| | | Formulation A | | Formulation B | |
| | Graft copolymer | WFK 20 D | MG 111 | WFK 10 D | MG 111 |
| Example | | | | | |
| 1 | 1 | 64.3 | 43.1 | 65.3 | 48.2 |
| 2 | 2 | 55.3 | 36.8 | 64.2 | 43.1 |
| 3 | 3 | 63.4 | 40.5 | 65.1 | 48.1 |
| 4 | 4 | 61.2 | 34.0 | 65.0 | 47.7 |
| 5 | 5 | 64.2 | 44.9 | 64.7 | 46.8 |
| 6 | 6 | 64.3 | 42.5 | 63.9 | 47.3 |
| 7 | 7 | 61.9 | 37.2 | 64.8 | 44.3 |
| Comparative Example 1 | without polymer | 53.0 | 35.2 | 62.0 | 41.3 |

TABLE 1-continued

| | Primary detergency | | | |
| --- | --- | --- | --- | --- |
| | Whiteness - % reflectance | | | |
| | Formulation A | | Formulation B | |
| Graft copolymer | WFK 20 D | MG 111 | WFK 10 D | MG 111 |
| Whiteness prior to wash | 40.6 | 24.5 | 43.0 | 24.5 |

TABLE 2

| | | Grayness | | | |
| --- | --- | --- | --- | --- | --- |
| | | Secondary detergency-% reflectance | | | |
| | Graft copolymer | Formulation A | | Formulation B | |
| | | PES | Co/PES | PES | Co/PES |
| Example | | | | | |
| 8 | 1 | 75.7 | 67.9 | 70.1 | 70.0 |
| 9 | 2 | 67.5 | 64.1 | 67.6 | 61.3 |
| 10 | 3 | 72.9 | 63.1 | 69.6 | 60.8 |
| 11 | 4 | 67.5 | 67.9 | 67.7 | 59.9 |
| 12 | 5 | 70.7 | 67.5 | 69.3 | 65.8 |
| 13 | 6 | 67.3 | 63.1 | 69.6 | 64.5 |
| 14 | 7 | 70.1 | 68.0 | 69.6 | 60.9 |
| Comparative Example 2 | without polymer | 65.2 | 62.8 | 65.6 | 59.8 |
| Whiteness prior to wash | | 80.0 | 82.7 | 80.0 | 82.7 |

The graft copolymers of the present invention can be used for preparing liquid detergent formulations which shown distinctly improved primary detergency not only in respect of pigment/grease soiling but also in the case of clay soiling. At the same time they prevent the redeposition of the detached soil on the fabric from the wash liquor.

The graft polymers described are also effective as soil release additives. Soil release additives are detergent additives which greatly facilitate the removal of in particular oil-containing stains, as may be incurred when dealing with machines or motor vehicles, from hydrophobic fabrics, for example polyester fabrics or cotton/polyester blend fabrics.

The soil release effect is measured by the following test method:

Small pieces of polyester fabric and cotton/polyester fabric are washed in a Launder-O-meter (from Atlas, Chicago) with a detergent formulation which includes 1% of an in-test graft polymer or of a prior art soil release additive. The comparative test is carried out without the additive. After the wash the pieces of fabric are dried without rinsing.

Then 0.2 g of used engine oil from a diesel vehicle is applied to each piece of fabric. A circular stain develops, which is black due to the soot. After 10 minutes this stain is squeezed off between filter paper in order to remove excess oil. The stain is then aged overnight at room temperature.

The reflectance of the oil stains on the pieces of fabric is then determined photometrically and the pieces are washed a second time with the same additions.

After drying, the reflectance is determined once more.

The soil release (SR) effect is calculated by the following formula:

$$\% SR = \frac{R - R_b}{R_0 - R_b} \times 100$$

$R$ = reflectance after wash
$R_b$ = reflectance before wash
$R_o$ = reflectance of unstained fabric The following values were obtained for the graft copolymers in a wash at 50° C. with 2 g/l of a bleach-free washing powder of the composition described hereinafter:

| Example | Comparative example | | PES | | | Co/PES | | |
| --- | --- | --- | --- | --- | --- | --- | --- | --- |
| | | | $R_0$ | R | SR % | $R_0$ | R | SR % |
| | 3 | without additive | 9.6 | 13.9 | 6.2 | 8.5 | 30.4 | 29.8 |
| | 4 | EG/PEG/TPS (prior art)* | 8.9 | 26.6 | 25.0 | 10.2 | 34.9 | 34.4 |
| 15 | | Graft copolymer 8 | 9.6 | 29.0 | 27.8 | 9.6 | 39.7 | 41.5 |
| 16 | | Graft copolymer 9 | 8.6 | 22.0 | 18.9 | 8.8 | 31.3 | 30.4 |
| 17 | | Graft copolymer 5 | 11.1 | 19.2 | 11.8 | 8.6 | 38.4 | 40.5 |
| 18 | | Graft copolymer 10 | 8.9 | 26.8 | 25.9 | 9.2 | 37.5 | 38.8 |
| 19 | | Graft copolymer 2 | 9.0 | 28.0 | 27.0 | 9.2 | 39.5 | 41.6 |

*SR additive described in DE-A-3 411 941 and US-A-3 926 152

According to these results, all the samples have a soil release effect.

More particularly, graft polymers 2, 8 and 10 are superior on polyester to the prior art. On cotton/polyester it is graft copolymers 2, 5, 8 and 10 which exceed the prior art.

The washing powder used had the following composition:

| $C_{13}/C_{14}$ oxo process alcohol reacted with | |
| --- | --- |
| 8 mol of ethylene oxide | 10% |
| Sodium carbonate | 35% |
| Sodium disilicate | 10% |
| Additive as per Table 3 | 0 or 1% |
| Sodium sulfate | to 100% |

We claim:

1. A phosphate-free or low-phosphate detergent comprising:
   a) a surfactant; and
   b) 0.1–20% by weight based on the formulation, of a water-soluble or water-dispersible grafted protein obtained by free radical copolymerization of
   (A) monoethylenically unsaturated monomers selected from the group consisting of esters of a monoethylenically unsaturated $C_{3-8}$ carboxylic acids with monohydric or polyhydric $C_{1-22}$ alcohols, esters of a monoethylenically unsaturated $C_{3-8}$ carboxylic acids with the addition products of 1–50 mol of alkylene oxide with 1 mol of a $C_{1-22}$ alcohol, amides of $C_{3-8}$ carboxylic acids which are derived from ammonia, $C_{1-22}$ alkylamines or $C_{1-22}$ dialkylamines, nitriles of carboxylic acids, vinyl ethers of $C_{1-8}$ alcohols, vinyl esters of saturated $C_{1-22}$ carboxylic acids, N-vinylamides, vinylpyridines, acrylamidopropanesulfonic acid, acrylamidoethanesulfonic acid, N,N-dialkylamino-$C_{2-4}$-alkyl(meth)acrylamides, styrene, alkylstyrene and a mixture thereof;

(B) a protein in a weight ratio of (A):(B) of (0.5–90):(99.5–10).

2. The phosphate-free or low-phosphate detergent of claim 1, wherein said monoethylenically unsaturated monomers are selected from the group consisting of vinyl acetate and n-butyl acrylate.

3. The phosphate-free or low-phosphate detergent of claim 1, wherein said protein is selected from the group consisting of casein, gelatin, bone glue, or a protein from soybeans, cereals, corn or peas or a mixture thereof.

* * * * *